United States Patent [19]
Kimura

[11] Patent Number: 5,634,995
[45] Date of Patent: Jun. 3, 1997

[54] RADIAL TIRE FOR HEAVY LOAD AND HAVING 80% OR LOWER ASPECT RATIO

[75] Inventor: Tatsuo Kimura, Akashi, Japan

[73] Assignee: Sumitomo Rubber Industries, LTD., Hyogo-Ken, Japan

[21] Appl. No.: 280,817

[22] Filed: Jul. 26, 1994

[51] Int. Cl.⁶ .............................. B60C 3/04; B60C 9/08; B60C 15/00; B60C 15/06
[52] U.S. Cl. ..................... 152/454; 152/539; 152/543; 152/546; 152/552; 152/554
[58] Field of Search ................................ 152/539, 552, 152/542–543, 546, 554, 548, 454

[56] References Cited

U.S. PATENT DOCUMENTS

| | | | |
|---|---|---|---|
| 1,459,377 | 6/1923 | Peeples | 152/543 |
| 4,840,213 | 6/1989 | Koseki | 152/454 |
| 5,181,978 | 1/1993 | Ochiai | 152/546 X |

FOREIGN PATENT DOCUMENTS

| | | | |
|---|---|---|---|
| 59102604 | 6/1984 | Japan | 152/546 |
| 1317814 | 12/1989 | Japan | 152/539 |
| 2267012 | 10/1990 | Japan | 152/539 |
| 3164310 | 7/1991 | Japan | 152/539 |
| 4260806 | 9/1992 | Japan | 152/542 |
| 6-1124 | 1/1994 | Japan | 152/542 |
| 6-24216 | 2/1994 | Japan | 152/542 |
| 6106925 | 4/1994 | Japan | 152/542 |
| 6156027 | 6/1994 | Japan | 152/542 |
| 6191240 | 7/1994 | Japan | 152/542 |
| 2004508 | 4/1979 | United Kingdom | 152/543 |

*Primary Examiner*—Adrienne C. Johnstone
*Attorney, Agent, or Firm*—Birch, Stewart, Kolasch & Birch, LLP.

[57] ABSTRACT

A radial tire for a heavy load having an aspect ratio of 80% or less, mountable to a standard 15° tapered rim, has a pair of tire beads, each of which includes an assembly of elements which improve the durability of the bead. Each of the tire beads includes a bead core, a cord reinforced carcass ply, the carcass ply being turned up around the bead core in each tire bead from inside to outside to terminate in a radially outer edge thus forming a carcass ply main portion and a pair of carcass ply turnup portions and a steel cord reinforcing filler which has a portion which extends from the bead core both axially and radially outward thereof to terminate in a radially outer edge, and satisfying the following relationships for each of the tire beads: $7.35 < (W_1/D) \leq 9.85$ wherein $W_1$ is a thickness of a side wall, along a line perpendicular to the carcass ply main portion, from the outer surface thereof to the radially higher one of either the outer edge of the carcass ply or the outer edge of the steel reinforcing filler, and D is the diameter of each cord of the radially higher one of the carcass ply or reinforcing filler.

2 Claims, 7 Drawing Sheets

RADIAL TIRE FOR HEAVY LOAD AND HAVING 80% OR LOWER ASPECT RATIO

BACKGROUND OF THE INVENTION

The present invention relates to a radial tire for heavy load having an aspect ratio of not larger than 80%, which can be mounted to a standard 15° tapered rim.

In conventional radial tires for heavy load in a variety of structures, the rigidity of the side wall increases due to the shortened distance between the tread and the bead by decreasing the aspect ratio. Therefore, the force which would be naturally absorbed by the side wall acts on the radially outer edge of a ply therein if the aspect ratio is not more than The durability of the bead consequently deteriorates in a tire of 80% or lower aspect ratio as compared with that of a tire having higher than 80% aspect ratio.

SUMMARY OF THE INVENTION

The object of the present invention is therefore to provide a radial tire for heavy load which can improve the durability of the bead even when the aspect ratio is 80% or lower.

In order to accomplish the above-described object, according to one aspect of the present invention, the depth or thickness of the side wall measured along a line perpendicular to a carcass ply main portion from the outer surface thereof to the radially higher of either the radially outer edge of a carcass ply turnup portion or the radially outer edge of a steel cord reinforcing filler, both of which are present in the bead as shown in FIGS. 1–2, and the diameter of each reinforcing cord of the radially higher of the carcass ply turnup portion or the filler are respectively established in a predetermined range in order to improve the durability of the bead.

In the above-described arrangement of the present invention, since the thickness of the side wall and the diameter of each cord are respectively established in the predetermined range, the assembling efficiently of the rim is not worsened while the rigidity of the bead is improved. The concentration of stress deformation at the radially outer ply edge is eliminated and at the same time, shocks to the radially outer ply edge are eased.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

A preferred embodiment of the present invention will be described in detail with reference to FIGS. 1–11.

Figure 1:
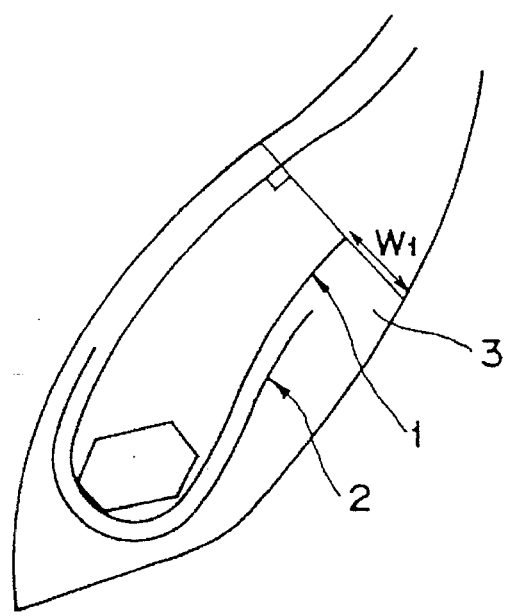
FIG. 1 is a schematic cross-sectional view of part of radial tire for a heavy load, as an example, so as to explain an embodiment of the present invention.
Figure 2:
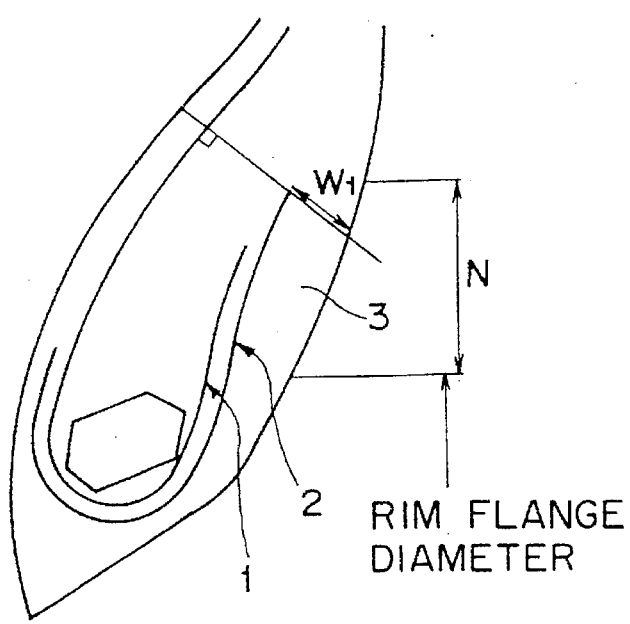
FIG. 2 is a schematic cross-sectional view of part of a radial tire for a heavy load, as another example, so as to explain the embodiment of the present invention.
Figure 3:
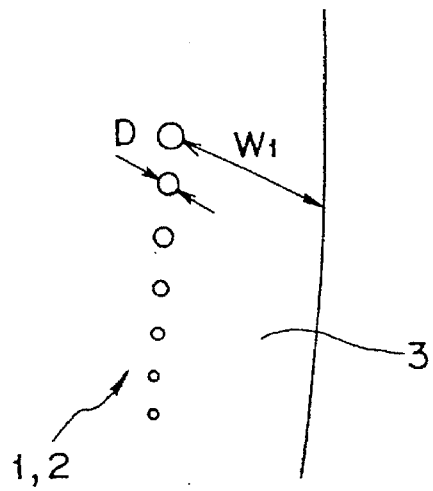
FIG. 3 is an enlarged cross-sectional view of a cord portion of a carcass ply turnup portion or filler.

A radial tire for a heavy load, having an aspect ratio of 80% or lower, can be mounted to a 15° tapered rim. As indicated in FIGS. 1, 2, when the thickness of a side wall 3 along a line perpendicular to the carcass ply main portion from the outer surface of the side wall 3 to the radially higher of the radially outer edge of a turnup portion of a carcass ply 1 reinforced with steel or organic fiber cords or the radially outer edge of a steel cord reinforcing filler 2 set outside the carcass ply 1 is represented by $W_1$ (each of the carcass ply 1 and the steel cord reinforcing filler 2 being turned up around a bead core from inside to outside), and the diameter of each cord of the radially higher of the turnup portion of the carcass ply 1 or the steel cord reinforcing filler 2 is represented by D (referring to FIG. 3), the radial tire of the embodiment of the present invention satisfies the relationship $7.35 < (W_1/D) \leq 9.85$ for each of the tire beads when the tire is mounted on the rim and inflated to the standard internal pressure. The 15° tapered rim referred to above is a "15° drop center rim" or "15° drop center alternate rim" regulated in the "YEAR BOOK" issued by THE TIRE AND RIM ASSOCIATION INC. or, "15° drop center rim" regulated in the "JATMA YEAR BOOK" issued by THE JAPAN AUTOMOBILE TIRE MANUFACTURES' ASSOCIATION, INC. If ($W_1$/D) exceeds 9.85, the rigidity of the bead portion in increased, thereby worsening the assembling efficiency of the rim. On the other hand, if ($W_1$/D) less than 7.35, the rigidity is reduced in the vicinity of the radially higher outer edge, and therefore any stress deformation is concentrated at the radially higher outer edge and shock to the radially higher outer edge cannot be eased. Also, the radially higher outer edge is readily loosened.

Figure 9:
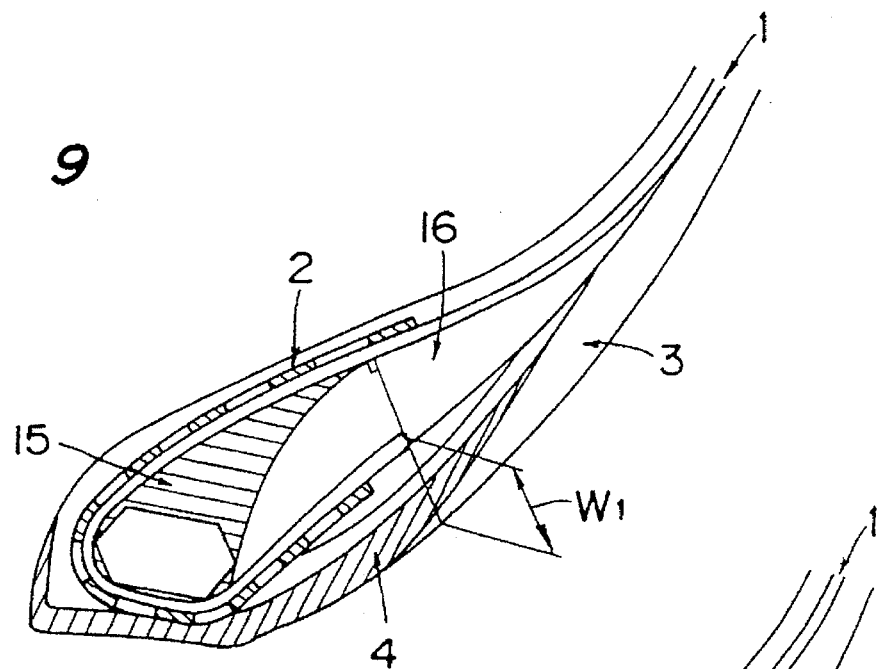
FIGS. 9, 10 are cross-sectional views of part of the radial tire, showing the structure more concretely than in FIGS. 1, 2.
Figure 10:
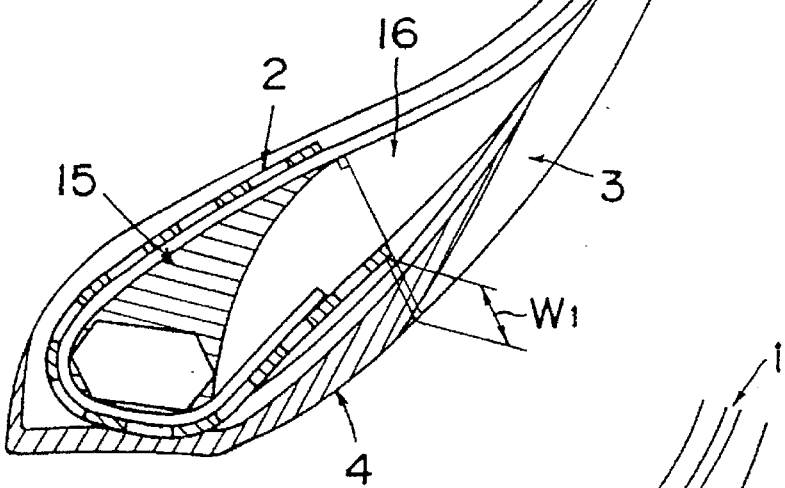
Figure 11:
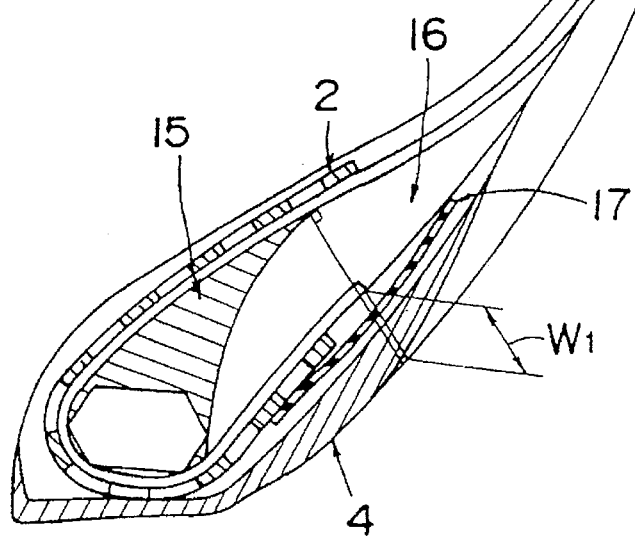
FIG. 11 is a cross-sectional view of part of the tire also having an organic fiber cord reinforcing filler.

FIG. 1 shows that the radially outer edge of the turnup portion of the carcass ply 1 is radially higher than that of the steel cord reinforcing filler 2. FIG. 2 shows an inverse case thereof. The structure of the radial tire is more specifically indicated in FIGS. 9, 10. Referring to FIG. 9 reference numerals 15 and 16 denote respectively, a hard apex and a side wall packing (soft apex). FIG. 9 which corresponds to FIG. 1 shows that the radially outer edge of the turnup portion of the carcass ply 1 is higher than that of the steel cord reinforcing filler 2. FIG. 10 corresponds to FIG. 2, in Which the radially outer edge of the steel cord reinforcing filler 2 is higher than that of the turnup portion of the carcass ply 1. In FIG. 11, an organic fiber cord reinforcing filler, e.g., a nylon cord reinforced filler 17 is interposed between the steel cord reinforcing filler 2 and an axially outer rubber chafer 4 such that it is radially higher than the radially outer edge of the turnup portion of the carcass ply 1 and the radially outer edge of the steel cord reinforcing filler 2. In the case of FIG. 11, the thickness $W_1$ of the tire is determined based not on the organic fiber cord reinforcing filler 17, but on the radially higher of the turnup portion of the carcass ply 1 and the steel cord reinforcing filler 2, as a reference. In FIGS. 9–11, the hardness of the hard apex 15 according to JIS (Japanese Industrial standards) A hardness is 90±10 (Hs) and that of the side wall packing 16 is 60±10 (HS).

Figure 8:
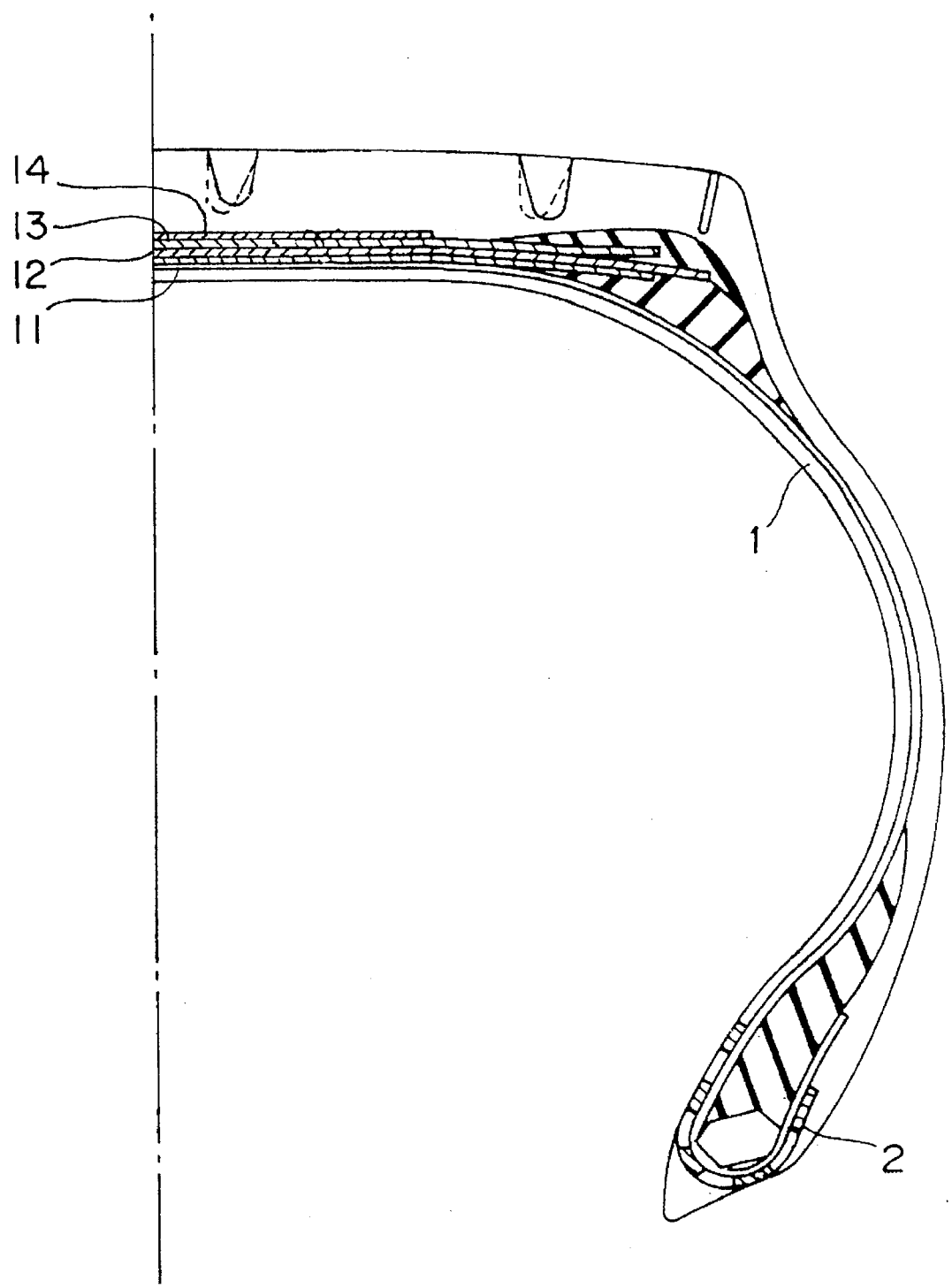
FIG. 8 is a cross-sectional view of the tire in the embodiment.

The tire of the embodiment is indicated in cross section in FIG. 8 in which reference numerals 11-14 denote a first breaker, a second breaker, a third breaker, and a fourth breaker, respectively. The four breakers 11–14 are reinforced with steel cords inclined at 50°–70° to the circumferential direction of the tire. The cords of the carcass ply 1 are inclined at approximately 90° to the circumferential direction. Although the tire in FIG. 8 is provided with four breakers, only three breakers can be used with the fourth breaker 14 omitted.

Figure 4:
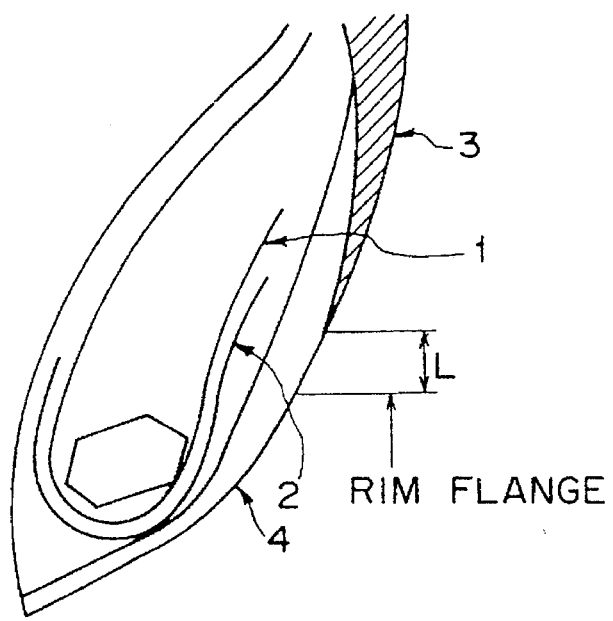
FIG. 4 is an explanatory diagram for explaining the height L.
Figure 5:
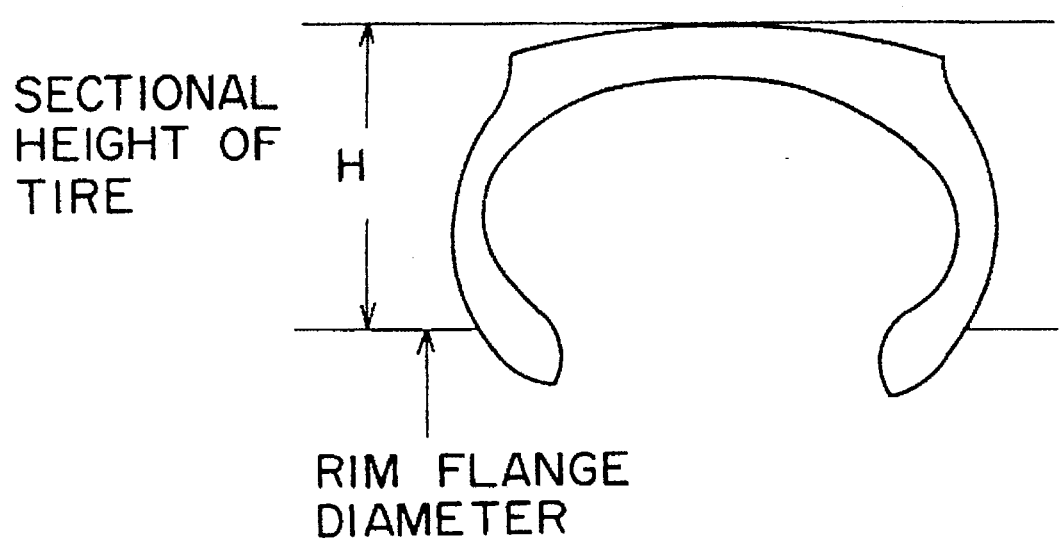
FIG. 5 is an explanatory diagram for explaining the sectional height H.

In addition to the above-discussed arrangement, as shown in FIGS. 4 and 5, it is preferable for the tire to satisfy the relationship 0<(L/H)<0.075 wherein, when the tire is mounted on the rim and inflated to the standard internal pressure, L is the radial height of the standard 15° tapered rim flange to the outer end of the boundary between the side wall 3 and the rubber chafer 4, ad H is the sectional height of the tire. A rubber A of the side wall 3 has preferably a 54–59 hardness according to JIS A hardness, while a rubber B of the rubber chafer 4 is desired to have a 73–77 hardness according to JIS A hardness. If the JIS A hardness of the rubber A is smaller than 54, the rigidity of the side wall is decreased and the steering performance deteriorates. In the case where the JIS A hardness of the rubber A is over 59, cutting defects or flaws if formed in the rubber portion of the side wall readily grow. Meanwhile, if the JIS A hardness of the rubber B is lower than 73, the rigidity of the bead portion is reduced thereby aggravating the stress deformation thereat. The bead portion becomes damaged easily and rubs against the rim when in contact therewith. When the rubber B has a higher hardness than 77, the rigidity of the bead portion is increased so much that the assembling efficiency of the rim is worsened. Moreover, when (L/H) is 0.075 or larger, the rubber chafer 4 is easily subject to being cut and extended up in the radial direction to a position where it can be easily subject to cut damage, and thus, the undersirably cut rubber chafer 4 cracks because the rubber chafer 4 is harder than the side wall 3. On the other hand, if (L/H) is not larger than 0, the side wall 3 is brought in touch with the rim and easily deformed, thereby rubbing the rubber of the side wall 3 against the rim which, if cutting defects or flaws are present in the side wall rubber, causes damage. As such, the position of the lower end of the side wall 3 is regulated as above to further improve the durability of the bead.

Referring to FIG. 2, supposing that, when the tire is mounted on the rim and inflated to the standard internal pressure, the radial height of the standard 15° tapered rim flange to the radially higher of the radially outer edge of either the turnup portion of the carcass ply 1 or the steel cord reinforcing filler 2 is N, (N/H) is preferably set within 0.13–0.21. The reason is that it is impossible to prevent the radially outer edge from slipping out due to the internal pressure introduced into the tire if (N/H) is smaller than 0.13, thereby readily causing damage. Also, if the radially outer edge is moved to a position which is closer to the side wall where the radially outer edge undergoes a large stress deformation, the stress deformation in the vicinity of the radially outer edge increases to readily cause the loosening of the radially outer edge if (N/H) is over 0.21.

The correlation of (L/H) and ($W_1$/D) and that of (N/H) and ($W_1$/D) is discussed below.

Figure 6:
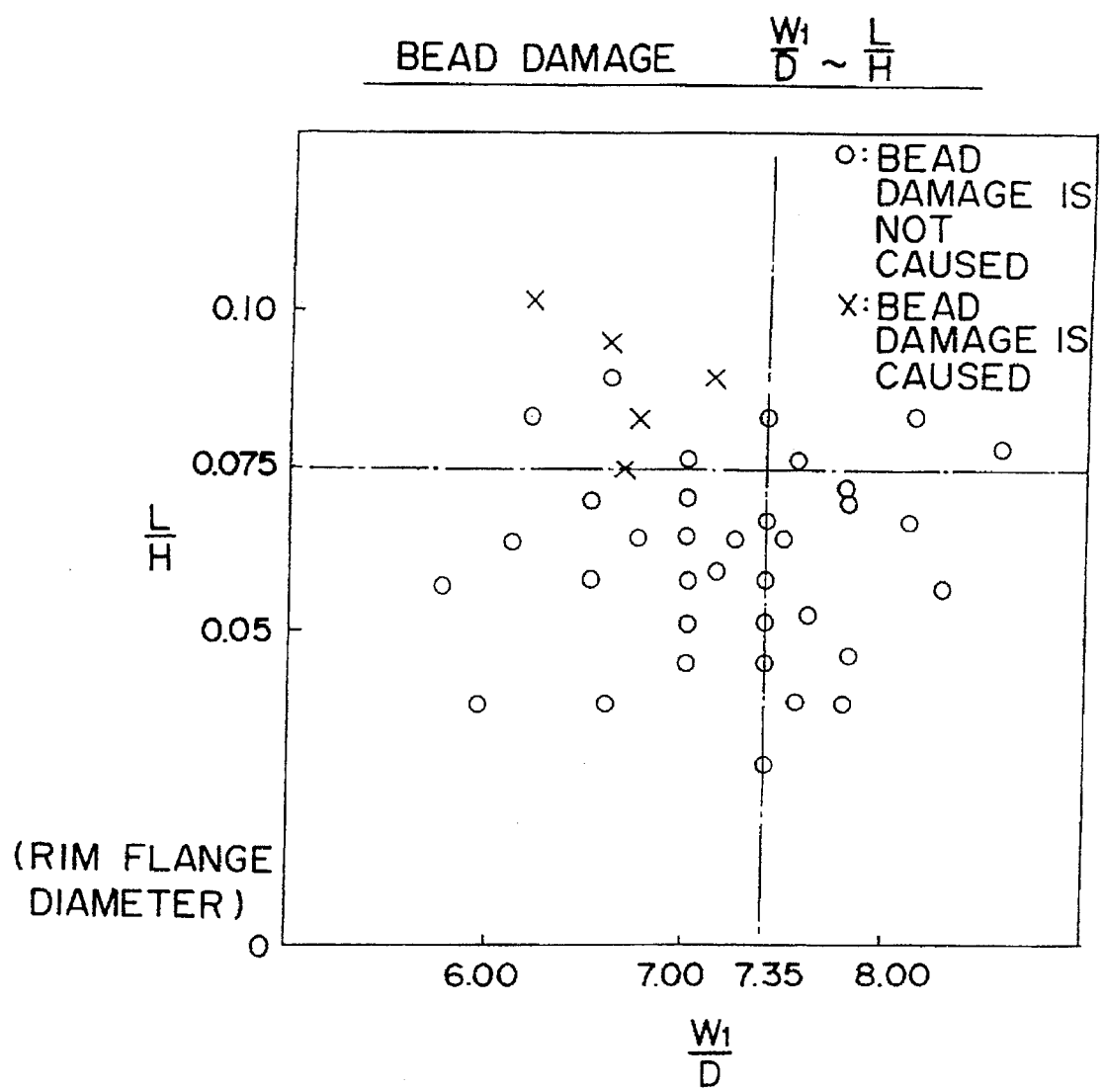
FIG. 6 is a graph of the relationship between (L/H) and ($W_1$/D)
Figure 7:
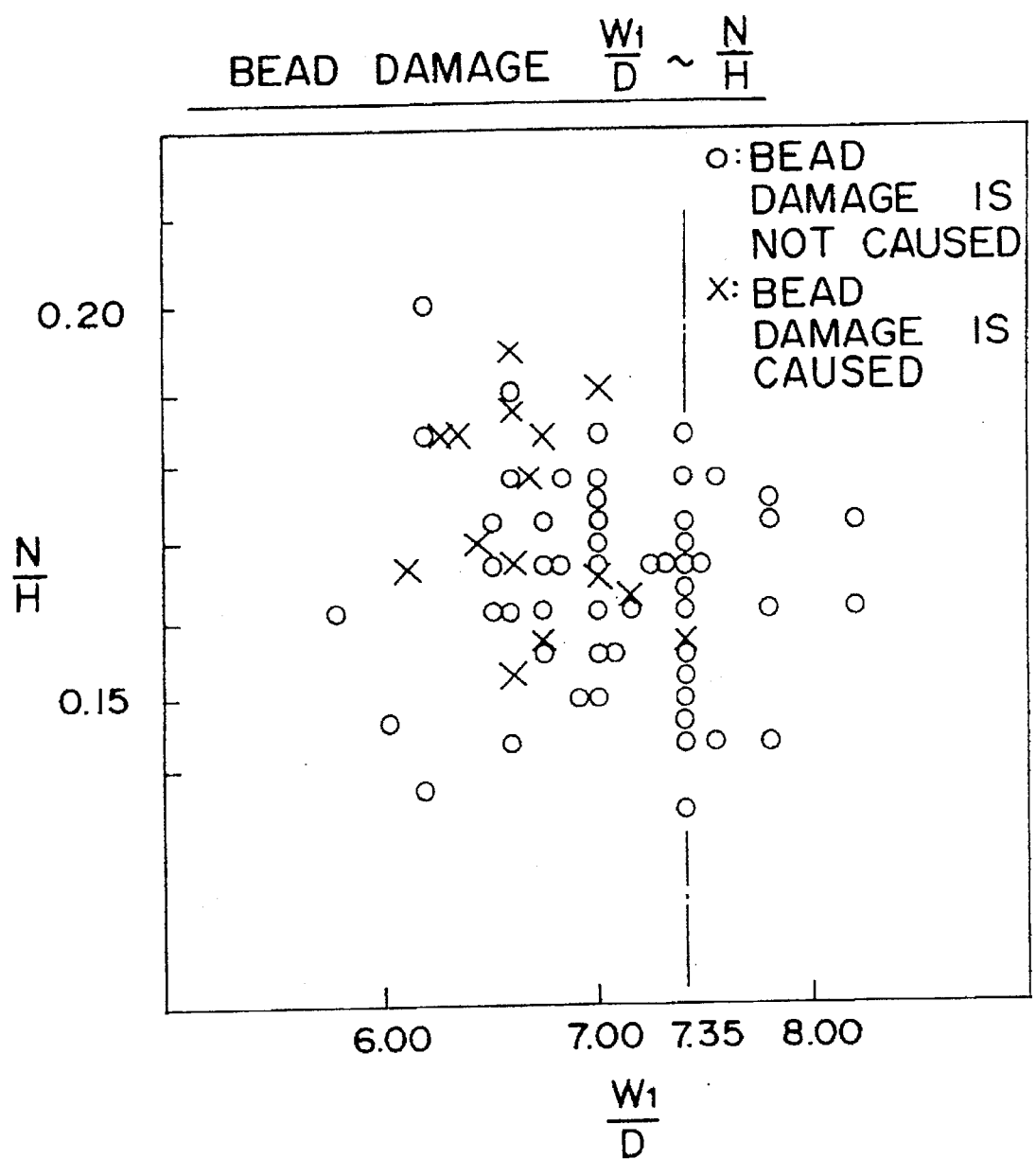
FIG. 7 is a graph of the relationship between (N/H) and ($W_1$/D)

In order to study the above relationships, samples of tires were produced which 255/70R22.5 or 285/75R24.5 and subjected to running tests to investigate the presence/absence of damage to beads. The standard rims of the tires are 7.50×22.5 and 8.25×24.5, respectively, and the standard internal pressures are 8.3 kg/cm$^2$ and 7.5 kg/cm$^2$, respectively. The test results of the tires running 200,000 km with a load of 100% of the carrying capacity is indicated in FIGS. 6, 7. Specifically, FIG. 6 shows the relationship between (L/H) and ($W_1$/D) and FIG. 7 shows the relationship between (N/K) and ($W_1$/D).

In the above embodiment, both the thickness of the side wall 3 from the outer surface there of to the radially higher of the radially outer edge of the turnup portion of the cord reinforced carcass ply 1 and the radially outer edge of the steel cord reinforcing filler 2 and the diameter of each cord of the radially higher of the turnup portion of the carcass ply 1 or the steel cord reinforcing filler 2 are respectively established in a predetermined range. Accordingly, the worsening of the assembling efficiency of the rim resulting from the increase of the rigidity is prevented, while the durability of the bead is improved. The stress deformation is prevented from being concentrated at the radially outer edge and moreover, shock to the radially outer edge of the turnup portion of the carcass ply 1 or the steel cord reinforcing filler 2 is eased.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

I claim:

1. A radial tire for a heavy load having an aspect ratio of 80% or less, mountable to a standard 15° tapered rim, having a pair of tire beads, each of the tire beads including a bead core, a cord reinforced carcass ply, the carcass ply being turned up around the bead core in each tire bead from inside to outside to terminate in a radially outer edge thus forming a carcass ply main portion and a pair of carcass ply turnup portions, and a steel cord reinforcing filler which has a portion which extends from the bead core both axially and radially outward thereof to terminate in a radially outer edge, and satisfying the following relationships for each of the tire beads: 7.35<($W_1$/D)≦9.85 wherein $W_1$ is a thickness of a side wall, along a line perpendicular to the carcass ply main portion from the outer surface thereof to the radially higher one of either the outer edge of the carcass ply or the outer edge of the steel reinforcing filler, and D is the diameter of each cord of the radially higher carcass ply or reinforcing filler and, when the tire is mounted on the rim and inflated to the standard internal pressure, N/H=0.13 to 0.21, wherein N is the radial height of the rim flange to the radially higher outer edge of either the carcass ply or the reinforcing filler and H is the sectional height of the tire.

2. The radial tire for a heavy load according to claim 1, wherein each of the tire beads further includes a rubber chafer, and which further satisfies the relationship for each of the tire beads, when the tire is mounted on the rim and inflated to the standard internal pressure: 0<(L/H)<0.075 wherein L is a radial height from the rim flange to an outer end of the boundary between the side wall and the rubber chafer, and H is the sectional height of the tire.

* * * * *